United States Patent Office 2,965,686
Patented Dec. 20, 1960

2,965,686

TITANIUM SUBCHLORIDE CATALYSTS AND USE IN ALKYLATION PROCESS

Erhard J. Prill, Dayton, Ohio, assignor to Monsanto Chemical Company, St. Louis, Mo., a corporation of Delaware No Drawing. Filed Apr. 19, 1957, Ser. No. 653,749

10 Claims. (Cl. 260—671)

The present invention relates to catalysts of use in organic reactions, and more particularly provides a new catalyst comprising titanium subchloride supported on a solid aluminiferous material, the method of preparing the new catalyst and methods of conducting hydrocarbon conversion reactions in which the new catalyst is employed.

An object of the present invention is to provide a catalyst for use in such hydrocarbon conversion processes as alkylation of paraffinic or aromatic hydrocarbons with alkyl halides or olefins, the isomerization of saturated hydrocarbons, the rearrangement or disproportionation of alkylaromatic hydrocarbons and the polymerization of unsaturated hydrocarbons.

The above types of reactions have been generally conducted in prior art by use of Friedel-Crafts type metal halide catalysts, e.g., anhydrous aluminum chloride, zirconium tetrachloride or ferric chloride, or acidic catalysts such as sulfuric acid, hydrofluoric acid or boron trifluoride. These catalysts generally have the disadvantage of either being so active that they give rise to difficultly resolvable complexes and sludges, or of being so weak that operations based on their use are not economically feasible. Also, most of the prior Friedel-Crafts type catalysts are so volatile that their use was necessarily limited to liquid phase reactions; others are so insoluble that operation in the presence of an extraneous solvent or diluent such as carbon tetrachloride was required.

The present invention provides a catalyst, useful for either liquid phase or vapor phase hydrocarbon reactions, comprising titanium subchloride and a solid aluminiferous material as a supporting medium therefor. By titanium subchloride is meant a chloride in which the titanium exhibits less than its maximum valence, i.e., possesses a valence of less than four, e.g., titanium trichloride and titanium chloride. The titanium subchloride may be mixed with, or deposited, upon carrier materials such as activated alumina, partially dehydrated aluminum oxide, bauxite, kaolin, manufactured ceramic supports such as Porocel, saddle packing, pipe clay, etc., and the resulting catalyst utilized either in liquid phase or vapor phase processes. Thus an intimate mixture of titanium subchlorides and granules of carrier upon which said carrier has been deposited may be immersed in the liquid reactants for catalyzing a liquid phase conversion process, or the catalyst may be utilized in stationary catalyst beds, over which the hydrocarbon reactants are passed.

Conveniently, the catalyst is prepared by in situ formation of titanium subchloride, i.e., titanium trichloride or titanium dichloride or a mixture of the same, upon the aluminiferous support or carrier. This may be done by heating a mixture of titanium tetrachloride, metallic titanium and a substantially dehydrated aluminiferous support in an inert atmosphere. While the titanium subchloride may also be deposited on the support by passing dry hydrogen into a suspension of the support in liquid titanium tetrachloride, or by passing a mixture of hydrogen and titanium tetrachloride over the heated support, reduction with hydrogen involves the liberation of by-product hydrogen chloride which can be removed from the catalyst mass only by tedious and time-consuming effort. Whereas some hydrocarbon conversion processes, e.g., alkylation by olefins, may be actually promoted by a mixture of titanium subchlorides and hydrogen chloride on an aluminiferous support, the difficulty with which a necessarily constant low level of hydrogen chloride can be achieved does not generally warrant reduction by hydrogen.

In practice, I prefer to prepare the catalyst as follows: Substantially dehydrated aluminiferous material such as alumina is mixed with the metallic titanium preferably in comminuted form, i.e., granulated, powdered, or thinly ribboned. The alumina is present in the mixture in a preponderant amount and contains at least enough titanium to give, upon reaction with titanium tetrachloride a quantity of from 0.01 percent to 15.0 percent of titanium subchlorides based on the weight of the alumina. The mixture of alumina and titanium is placed in a reaction zone and heated in an atmosphere of argon to a temperature which is above the vaporization point of titanium tetrachloride, e.g., at a temperature of from, say, 137° C. to 700° C. Vapors of titanium tetrachloride are then passed into the reaction zone while maintaining the temperature of the reaction zone at above the vaporization point of said tetrachloride. While introduction of titanium tetrachloride vapors is generally continued until sufficient tetrachloride has been made available for reaction with all of the elemental titanium content of the mixture, the quantity of tetrachloride which is led into the zone is immaterial since unreacted elemental titanium appears to have no detrimental effect on the catalyst and unreacted titanium tetrachloride may be readily removed from the reaction zone by sweeping it out with an inert gas. For preparation of the present catalyst, however, there should be introduced sufficient titanium tetrachloride to provide for a deposit of titanium subchlorides upon the aluminiferous support which is equivalent to from 0.01 percent to 15.0 percent by weight of the support material. Also, since it has been found that very thin layers of titanium subchlorides on said support provide for optimum catalytic activity, it is recommended that said starting titanium content, said tetrachloride flow, and other operating conditions be so regulated that the upper limit of titanium subchlorides in the finished catalyst does not substantially exceed, say 15 percent by weight of the support material.

After titanium tetrachloride flow into the reaction zone has been discontinued, the contents are allowed to cool, preferably in the inert atmosphere employed for its preparation. Any excess of titanium tetrachloride may be removed either during the cooling or subsequently by sweeping with, say, nitrogen or argon.

The thus prepared catalyst may be employed directly in hydrocarbon conversion processes or stored for use at a later time. For use in vapor phase reactions, the present supported catalyst may be conveniently prepared in apparatus, e.g., a tubular reactor or tower, which is adapted to vapor phase reactions. Such an apparatus may suitably comprise one or more inlets through which the charge stock is introduced and an exit from which the product is conveyed, advantageously through a condenser to a receiver unit. Depending upon the size and shape of the reactor, the catalyst is positioned therein either in a single layer or in a number of suitably spaced beds. When using the catalyst in vapor phase alkylations, isomerizations, or polymerizations, exit gases may be recycled with fresh stock for conversion of residual reactive material present in the product. The vapor phase reactions, depending upon the nature of the individual reactants and products desired may be conducted at ordinary or increased temperatures and at ordinary or superatmospheric pressures.

When employing the supported titanium subchloride catalyst in liquid phase reactions, the catalyst is simply dispersed or suspended in at least one of the reactants or in a solvent therefor and reaction is effected at ordinary or increased temperature at pressures which may be ordinary or superatmospheric. When employed in alkylation reactions wherein, contrary to the situation which generally obtains in isomerizations and polymerizations, more than one reactant is used, the catalyst may be immersed in a liquid reactant and the other reactant is subsequently added thereto while maintaining the temperature of the reaction mixture at the optimum point. This is particularly convenient when one of the reactants is gaseous, for instance in reactions such as the ethylation of benzene with ethylene or the isopropylation of biphenyl with propylene.

Liquid phase reactions wherein the present catalyst is used may be continuous or batch-wise. When operating batch-wise, the reactant or reactants are maintained in contact with the catalyst at experimentally determined optimum temperatures and pressures until reaction has been substantially completed, and the product removed from the catalyst, e.g., by decanting or filtering. In continuous operation, the product, as it is formed, is continuously removed from the reactor while feeding additional reactant stock and/or catalyst to the reactor.

Polymerization of such lower aliphatic olefins as ethylene or propylene or mixtures of the same to obtain solid polymers may be effected in the vapor phase whereby the gaseous charge stock is polymerized as it travels through the catalyst-filled reaction zone and the issuing vaporous polymers allowed to condense or pass into a non-solvent from which the polymeric products precipitate. Conveniently also, the polymerization may be effected by passing the lower aliphatic olefin into an inert liquid wherein the present catalyst is suspended or dispersed. The resulting solution of polymer is decanted from the lower catalyst layer, and the polymer recovered from the decanted solution simply by evaporating off the solvent or by precipitation from a non-solvent.

While the present supported titanium subchloride catalyst is useful in catalyzing hydrocarbon conversion processes generally it is most advantageously employed when an olefin-containing hydrocarbon feed is employed, e.g., in alkylation of an aromatic hydrocarbon having a replaceable nuclear hydrogen atom with an aliphatic mono-olefin or in the polymerization of aliphatic mono-olefinic hydrocarbons.

As herein stated, such reactions take place either in the liquid or vapor phase; hence operation within broad temperature ranges, say, at temperatures of from 30° to 300° C. is feasible.

Other examples of uses for which the present titanium subchloride catalyst is eminently suited are shown in the following examples which, while giving detailed directions for preparation of the catalyst and its application to hydrocarbon conversion processes, are included herewith only by way of additional illustration and not for the purpose of limiting the invention.

*Example 1*

Alumina (186 g. 4–8 mesh, grade F–1, brand name, "Alcoa") was activated by placing it in a 25 mm. x 36" Vycor tube and evacuated for four hours at 600° C./20 mm., three hours at 600° C./0.1 mm. and eleven hours at 600° C./0.01 mm. Heat was provided by two combustion furnaces. The tube with its thus activated alumina was allowed to cool, flooded with argon and said alumina allowed to flow through an adapter into a dry mixing flask containing 1.5 g. of titanium turnings. After thoroughly mixing the alumina with the titanium particles, the mixture was returned to the tube through the adapter. The tube was then connected to a flask containing ca. 500 ml. of titanium tetrachloride. The tetrachloride was distilled into and through the mixture of alumina and titanium at a temperature of 460–656° C. under an atmosphere of argon for a time of thirty minutes. The tube contents were allowed to cool in an atmosphere of argon and titanium tetrachloride vapor and then flushed with argon to remove titanium tetrachloride. The thus prepared alumina-supported titanium subchloride catalyst was employed for the alkylation of cumene as follows:

A portion (66 g.) of said catalyst was transferred under argon to a flask containing 189 g. of cumene, and propylene was passed into the flask for two hours and fifteen minutes at a temperature of from 40° C. to 146° C., mostly at 146° C., the refluxing temperature of the reaction mixture.

The resulting product was washed with water, extracted with ether, and the ether extract dried over anhydrous magnesium sulfate and filtered. Distillation of the filtrate gave 136.6 g. of unreacted cumene, B.P. 143–151° C., 36.9 g. of diisopropylbenzene, B.P. 83–97° C./25 mm., $n_D^{25}$ 1.4875 and 2.3 g. of triisopropylbenzene, B.P. 120° C./25 mm., $n_D^{25}$ 1.4908. This represents a 42.9% yield of mono-alkylated and a 3.0% yield of higher alkylated cumene based on the non-recovered cumene.

*Example 2*

In order to compare the efficiency of an alumina-supported titanium tetrachloride catalyst with the supported titanium subchloride catalyst of Example 1, a catalyst was prepared as follows:

Alumina (180 g., the type employed in Example 1) was activated substantially as in Example 1, the tube of activated alumina was allowed to cool under argon, and about 500 ml. of titanium tetrachloride was distilled through the Vycor tube of Example 1 under a slow stream of argon. The exterior temperature of the tube was held at about 600° C. during the distillation. The tube and its contents were then allowed to cool under a stream of nitrogen and titanium tetrachloride, and then swept with argon for three hours.

A portion (43 g.) of the alumina-supported titanium tetrachloride thus prepared was transferred in a stream of argon to a 500 ml. 4-neck flask equipped with stirrer, thermometer, gas inlet tube and condenser and containing 128 g. of cumene. Propylene was passed into the flask for three hours at a temperature of 75° C.–146° C., mostly at 146° C., the refluxing temperature of the reaction mixture. The reaction flask was then cooled and the contents thereof poured into water and extracted with ether. After washing the extract with water and bicarbonate, drying over magnesium sulfate and filtering, the filtrate was distilled to give 81.4 g. of unreacted cumene, B.P. 148–153° C., 17.4 g. of isopropylcumene B.P. 93–96° C./26 mm., and 2.5 g. of higher boiling material, $n_D^{25}$ 1.5057, probably a mixture of tri-, tetra-, penta-, and hexa-isopropylbenzene. This represents a 27.3% yield of monoalkylated and a 2.6% yield of higher alkylated cumenes, based on the unrecovered cumene. The 29.9% total yield of alkylated cumenes obtained compares unfavorably with the 45.9% total yield obtained in Example 1 by using the alumina-supported titanium subchloride catalyst within a slightly shorter reaction period but otherwise under the same operating conditions.

*Example 3*

A catalyst comprising titanium subchlorides supported on alumina was prepared as follows:

Alumina (131 g., 4–8 mesh, grade F–1, brand name "Alcoa") was placed in a Vycor tube and evacuated for fourteen hours at 600° C./0.01 mm. The tube and its contents were allowed to cool and 0.7 g. of titanium turnings was added to the alumina under a blanket of argon. The alumina and titanium turnings were then swept with argon at room temperature for thirty minutes. A flask containing about 400 ml. of titanium tetrachloride was attached to one end of said tube and a condenser with receiving flask was attached to the other end of the tube. The titanium tetrachloride was then heated and allowed to distill into and through the mixture of alumina and titanium metal at a temperature of from 384° C. to 628° C. for a time of one hour and ten minutes. At the end of that time the tube contents was allowed to cool in an atmosphere of argon and titanium tetrachloride. When cool, the alumina and its deposit of halide was finally swept with argon.

The thus-prepared catalyst, comprising titanium subchlorides supported on alumina was employed as a catalyst for alkylating benzene with propylene. Benzene and propylene were passed simultaneously over the catalyst at a temperature of 80° C.–150° C. for about three hours to give a condensate comprising a mixture of mono-, di-, tri- and tetrapropylbenzenes in a 12:2:7:1 ratio. It is to be noted that here, as in Examples 1 and 2, monoalkylation was prevalent.

While the above examples show only use of the present catalyst for the alkylation of benzene or cumene with propylene, it is to be understood, of course, that the invention is not restricted to such uses. Nuclear alkylation of aromatic hydrocarbons, generally, is catalyzed by the supported titanium subchloride catalyst. Thus, instead of using benzene or cumene as the aromatic component, there may be employed, e.g., ethylbenzene, o-, m- or p-, xylene, tert-amylbenzene, dodecylbenzene, naphthalene, α-methylnaphthalene, biphenyl, 4,4'-diisopropylbiphenyl, diphenylethane, etc. Also instead of using propylene as the alkylating agent, there may be employed other aliphatic mono-olefins, e.g., ethylene, 2-butene, 1-pentene, 2-hexene, 2,3-dimethyl-2-butene, 1-decene, and the lower polymeric olefins such as propylene trimer or tetramer or butylene dimer or trimer. Instead of employing an olefin as an alkylating agent, other alkylating agents may be used, e.g., alkyl halides such as ethyl, n-butyl or 2-ethylhexyl chloride, bromide or iodide. Partially chlorinated paraffins such as kerosene are alkylating agents which may be used to give commercially important products. While, depending upon the nature of the individual reactants, there will be some variation in operating conditions, such variations will be those to be expected by those skilled in the art. Thus, the highly active alkyl chlorides such as tert-butyl or tert-amyl chloride will not require, in alkylation reactions, the more stringent conditions of temperature, time and catalyst concentration which are required for a less active alkyl halide such as methyl chloride. Similarly, the use of an active aromatic compound such as toluene, 2-ethylhexylbenzene or naphthalene will require less stringent conditions than will be required when working with benzene. When employing the less reactive components, the present supported catalyst may comprise as much as 15% by weight of titanium subchlorides. The proportion of titanium subchlorides, as based on the alkylation reactants, however, will be within catalytic amounts, say, up to 5% by weight, based on the weight of the aromatic component.

As hereinbefore stated, the supported titanium subchloride catalyst of the present invention is a highly useful catalyst for hydrocarbon conversion processes, generally. It is advantageously employed, e.g., in alkylation of isoparaffins or naphthenes with aliphatic mono-olefins to give motor fuels; isomerization processes wherein the straight chain paraffinic content of a liquid petroleum hydrocarbon is converted partially, at least, to branched structures; cracking of paraffinic hydrocarbons; rearrangement of alkylaromatics, and polymerization of mono-olefinic hydrocarbons such as ethylene, propylene, 2-butene and styrene or mixtures of one or more of monoolefins with another olefin or a diolefin.

What I claim is:
1. The method of preparing a catalyst comprising titanium subchloride deposited on a solid aluminiferous material which comprises feeding vapors of titanium tetrachloride into a reaction zone containing an intimate, comminuted mixture of a minor quantity of metallic titanium and a major quantity of said aluminiferous material in an inert gaseous atmosphere, while maintaining the temperature of the reaction zone at 137° C. to 700° C., and discontinuing feeding of the tetrachloride when the aluminiferous material has had deposited thereupon from 0.01 percent to 15.0 percent of titanium subchloride based on the weight of the aluminiferous material.

2. The method of preparing a catalyst comprising titanium subchloride deposited on alumina which comprises feeding vapors of titanium tetrachloride into a reaction zone containing an intimate, comminuted mixture of a minor proportion of metallic titanium and a major proportion of alumina in an inert gaseous atmosphere, while maintaining the temperature of the reaction zone at 137° C. to 700° C., and discontinuing feeding of the tetrachloride when the alumina has had deposited thereupon a quantity of from 0.01 percent to 15.0 percent by weight of titanium subchloride based on the weight of the alumina, said mixture of titanium and alumina containing at least enough titanium to deposit said quantity of titanium subchloride on the alumina.

3. A catalyst for hydrocarbon conversion processes consisting essentially of titanium subchloride deposited on a solid aluminiferous material, the subchloride being from 0.01 percent to 15.0 percent by weight of the weight of the aluminiferous material.

4. A catalyst for hydrocarbon conversion processes consisting essentially of titanium subchloride deposited on alumina, the subchloride being from 0.01 percent to 15.0 percent by weight of the weight of the alumina.

5. A method of alkylating an aromatic hydrocarbon having a replaceable nuclear hydrogen which comprises contacting the hydrocarbon with an aliphatic mono-olefin in the presence of a catalyst comprising titanium subchloride deposited on a solid aluminiferous material, the subchloride being from 0.01 percent to 15.0 percent by weight of the weight of the aluminiferous material.

6. A method of alkylating an aromatic hydrocarbon having a replaceable nuclear hydrogen which comprises contacting the hydrocarbon with an aliphatic mono-olefin in the presence of a catalyst comprising titanium subchloride deposited on alumina, the subchloride being from 0.01 percent to 15.0 percent by weight of the weight of the alumina.

7. The method of alkylating benzene which comprises contacting the benzene with an aliphatic mono-olefin in the presence of a catalyst comprising titanium subchloride deposited on alumina, the subchloride being from 0.01 percent to 15.0 percent by weight of the weight of the alumina.

8. The method of alkylating cumene which comprises contacting the cumene with an aliphatic mono-olefin in the presence of a catalyst comprising titanium subchloride deposited on alumina, the subchloride being from 0.01 percent to 15.0 percent by weight of the weight of the alumina.

9. The method of alkylating benzene which comprises contacting the benzene with propylene in the presence of a catalyst comprising titanium subchloride deposited on alumina, the subchloride being from 0.1 percent to 15.0 percent by weight of the weight of the alumina.

10. The method of alkylating cumene which comprises contacting the cumene with propylene in the presence of a catalyst comprising titanium subchloride deposited on alumina, the subchloride being from 0.1 percent to 15.0 percent by weight of the weight of the alumina.

(References on following page)

References Cited in the file of this patent

UNITED STATES PATENTS

| | | |
|---|---|---|
| 2,328,430 | Dornte | Aug. 31, 1943 |
| 2,406,477 | Solomon | Aug. 27, 1946 |
| 2,406,869 | Upham | Sept. 3, 1946 |
| 2,670,270 | Jordan | Feb. 23, 1954 |
| 2,721,189 | Anderson et al. | Oct. 18, 1955 |
| 2,840,551 | Field et al. | June 24, 1958 |
| 2,843,577 | Friedlander et al. | July 15, 1958 |

FOREIGN PATENTS

| | | |
|---|---|---|
| 1,132,506 | France | Nov. 5, 1956 |

OTHER REFERENCES

Calloway: Chemical Reviews, vol. 17, 1935, pp. 327 and 374–377, page 375 only relied on.